Apr. 24, 1923.
M. N. COLVIN
SPOKE GRIP
Filed March 16, 1922
1,452,908
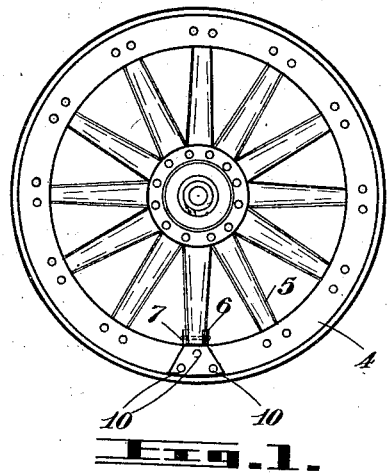
Fig.1.
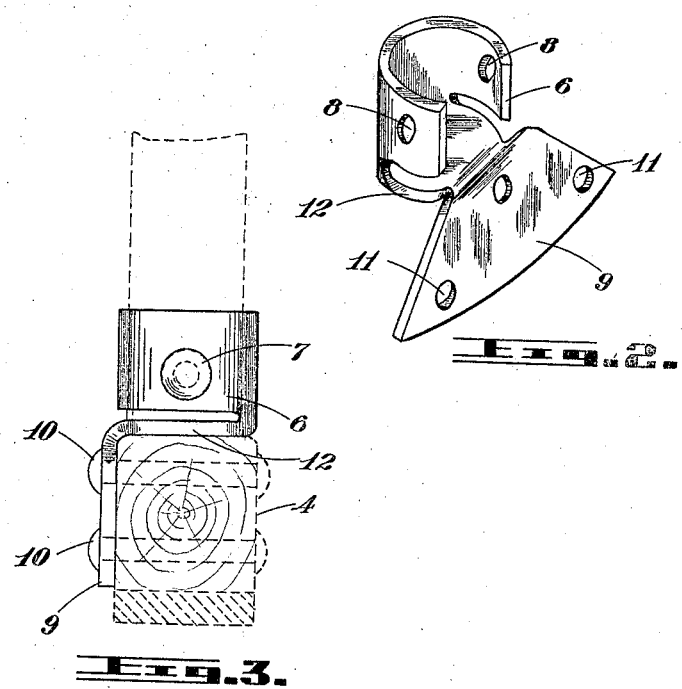
Fig.2.
Fig.3.
INVENTOR
*Milton Noah Colvin.*
BY *E. N. Bond*
ATTORNEY Patented Apr. 24, 1923.

1,452,908

UNITED STATES PATENT OFFICE.

MILTON NOAH COLVIN, OF KOMOKA, ONTARIO, CANADA.

SPOKE GRIP.

Application filed March 16, 1922. Serial No. 544,383.

*To all whom it may concern:*

Be it known that I, MILTON NOAH COLVIN, a citizen of the Dominion of Canada, residing at Komoka, in the county of Middlesex and Province of Ontario, Dominion of Canada, have invented certain new and useful Improvements in Spoke Grips, of which the following is a specification.

The present invention relates to attachable reinforcing means for vehicle wheel spokes, the principal object being to provide means of the character described which may be readily attached to a spoke, severed from the rim of the wheel and adapted to secure same to the rim of the said wheel.

With this and other objects in view, the invention consists in the construction, combination and arrangement of parts as will be hereinafter fully described, illustrated in the accompanying drawings and pointed out in the claim hereunto appended.

Figure 1 is a side elevation of a vehicle wheel embodying my present invention.

Figure 2 is a perspective view of the clamping member.

Figure 3 is a side elevation illustrating the clamping member engaged with the felly and a spoke of the said vehicle wheel.

Referring to the drawings, like numerals designate like parts in the various drawings.

The numeral 4 indicates the felly of the wheel and 5 the spokes. The clamping member is preferably stamped from sheet metal, the contour of which is configurated to comply with the contour of the felly and spoke of the wheel to which it is to be attached. The upper portion 6 of the clamping member fits around the severed spoke being secured thereto by rivets 7 passing through the said spoke and through the apertures 8. Plate 9 is adapted to be secured to the side of the felly and has plate 12 extending from it at right angles. The plate 9 of the clamping member is offset from the upper portion 6 to comply with the contour of the felly. The plate 9 is secured to the felly by a plurality of rivets 10 which pass through apertures 11 positioned in the same. The plate 12 is functioned to prevent the severed spoke from entering the aperture formed for the same.

It is obvious that when the clamping member is to be attached to the spoke of a wheel, the body member 6 will be bent downwardly in alignment with the plate member 12 and the same passed beneath the severed spoke. The body member 6 is then bent vertically, as indicated diagrammatically and the same substantially secured to the severed spoke. The plate member 9, when in the desired position, will then be secured to the felly of the wheel.

From the foregoing, it is thought that the construction of my invention will be clearly understood, and therefore, a more extended explanation has been omitted.

What I claim as new is:

The herein described attachable reinforcing means for vehicle wheel spokes stamped from sheet metal and comprising a body portion to embrace a spoke and having apertures for the reception of securing means, and a plate offset from said body portion and having apertures for the reception of means to secure it to a felly, said body portion and plate being bendable at their point of union and the body portion having a horizontal portion insertable beneath the end of the spoke.

In testimony whereof, I affix my signature in the presence of two witnesses.

MILTON NOAH COLVIN.

Witnesses:
W. H. LEITCH,
GEO. W. BROWNE.